United States Patent
Nilssen

[11] Patent Number: 5,180,952
[45] Date of Patent: Jan. 19, 1993

[54] ELECTRONIC TRACK LIGHTING SYSTEM

[76] Inventor: Ole K. Nilssen, Caesar Dr., Barrington, Ill. 60010

[21] Appl. No.: 831,086

[22] Filed: Feb. 7, 1992

Related U.S. Application Data

[63] Continuation of Ser. No. 611,334, Nov. 13, 1990, abandoned, which is a continuation of Ser. No. 484,278, Feb. 26, 1990, abandoned, which is a continuation-in-part of Ser. No. 387,370, Jul. 31, 1989, abandoned, which is a continuation of Ser. No. 108,963, Oct. 16, 1987, abandoned, which is a continuation of Ser. No. 741,132, Jun. 4, 1985, abandoned, which is a continuation-in-part of Ser. No. 667,691, Nov. 2, 1984, abandoned, which is a continuation-in-part of Ser. No. 487,817, Apr. 22, 1983, Pat. No. 4,506,318.

[51] Int. Cl.⁵ ............ H05B 37/00; H05B 39/00; H05B 41/26
[52] U.S. Cl. ................ 315/210; 315/209 R; 315/226; 315/DIG. 5
[58] Field of Search ........... 315/201, 205, 209 R, 315/210, 226, DIG. 5, DIG. 7

[56] References Cited

U.S. PATENT DOCUMENTS

| | | | |
|---|---|---|---|
| 3,733,541 | 5/1973 | Elms | 315/205 X |
| 4,207,498 | 6/1980 | Spira et al. | 315/201 |
| 4,414,617 | 11/1983 | Galindo | 362/404 |
| 4,506,318 | 3/1985 | Nilssen | 363/132 |
| 4,888,525 | 12/1989 | Nilssen | 315/212 |

Primary Examiner—David Mis

[57] ABSTRACT

To permit the more cost-effective use of low voltage lamps (especially 12 Volt Halogen lamps) in track lighting systems, the power track is supplied from the power line by way of a frequency-converting power supply providing onto the track conductors a voltage of normal power line voltage magnitude (120 Volt RMS) but of an exceptionally high frequency (30 kHz). As a result, the individual step-down voltage transformer required to provide the proper low voltage for operating each of the low voltage lamps becomes very light, small and inexpensive. Yet, in contrast with situations where the whole track may be provided with low voltage from a single step-down voltage transformer, there will be no unusual limitations in respect to track length and/or the number of low voltage lamps that can be used with a given track. Moreover, there will be no problem with using regular high voltage incandescent lamps intermixed with low voltage lamps. For improved efficiency and reduced bulk, the frequency-conversion means placed at the head of the track is a direct-coupled rectifier-inverter combination.

13 Claims, 2 Drawing Sheets

Fig. 1

PRIOR ART

ELECTRONIC TRACK LIGHTING SYSTEM

RELATED APPLICATIONS

This application is a continuation of Ser. No. 07/611,334 filed Nov. 13, 1990, now abandoned; which is a continuation of Ser. No. 07/484,278 filed Feb. 26, 1990, now abandoned; which is a continuation-in-part of Ser. No. 07/387,370 filed Jul. 31, 1989, now abandoned; which is a continuation of Ser. No. 07/108,963 filed Oct. 16, 1987, now abandoned; which is a continuation of Ser. No. 06/741,132 filed Jun. 4, 1985, now abandoned; which is a continuation-in-part of Ser. No. 06/667,691 filed Nov. 2, 1984, now abandoned; which is a continuation-in-part of Ser. No. 06/487,817 filed Apr. 22, 1983 now U.S. Pat. No. 4,506,318.

BACKGROUND OF THE INVENTION

1. Field of the Invention

The present invention relates to track lighting systems, particularly of a kind that is being powered by way of a frequency-converting power supply and in such a way that the track voltage is of substantially normal magnitude (120 Volt RMS) but of a much higher than normal frequency (20-40 kHz).

2. Description of Prior Art

Track lighting systems are being manufactured by a number of different companies. One such company is Halo Lighting Division of McGraw-Edison Company, Elk Grove Village, Ill. 60007; whose track lighting systems and products are described in their Catalog No. A8100.

Conventional track lighting systems are designed to operate from a conventional utility power line and to have regular 120 Volt/60 Hz voltage on the track. The lighting units plugged into the track must be able to operate directly from this 120 Volt/60 Hz voltage.

Low voltage incandescent lamps particularly 12 Volt Halogen lamps, have proven to be particularly attractive for track lighting purposes, and are being used to a growing degree. However, these low-voltage/Halogen lamps are designed to operate at a voltage of 12 Volt or less, and therefore have to be powered by way of voltage step-down transformation means. Thus, at present, whenever low-voltage/Halogen lamps are being used in track lighting systems, each such low-voltage/Halogen lamp has to be powered by way of such a voltage step-down transformation means; which implies that each lighting unit has to contain such a voltage step-down transformation means—a practice that results in costly, large and heavy track lighting units.

The use of a single large step-down transformation means capable of providing power at a suitably low voltage to the complete track has been considered and tried. However, the resulting track current becomes prohibitively large for most applications.

(Since a conventional track is designed to handle a current of not more than 16 Amp, it would only be capable of powering three or four typical low-voltage/Halogen lamps, which is far fewer than the number of lamps that would be required in most applications.)

SUMMARY OF THE INVENTION

Objects of the Invention

A first object of the present invention is that of a power-line-operated track lighting system that is particularly suitable for use with low-voltage incandescent lamps.

A second object is that of a track lighting system wherein the track is provided with a voltage of magnitude substantially equal to that of regular power line voltages but of a frequency substantially higher than those of regular power line voltages.

These as well as other objects, features and advantages of the present invention will become apparent from the following description and claims.

Brief Description

The present invention relates to means by which the track (or tracks) in a power-line-operated track lighting system is provided with a voltage of magnitude substantially equal to that of the voltage on the power line (120 Volt RMS), but of frequency much higher than that of the power line voltage.

In the preferred embodiment, this higher frequency is approximately 30 kHz; and this 30 kHz track voltage is obtained by way of a power-line-operated full-bridge inverter located at the head of the power track and feeding its output to the track conductors.

With such a high frequency on the track, and with the voltage being approximately of 120 Volt RMS magnitude, the voltage step-down transformation means required for operating low-voltage incandescent lamps (particularly 12 Volt Halogen lamps) are far smaller, lighter and lower in cost as compared with their 60 Hz counterparts.

At the same time, regular 120 Volt incandescent lamps may be used on the track, usually without any voltage transformation means.

DESCRIPTION OF THE PREFERRED EMBODIMENT

Description of the Drawings

Figure 1:
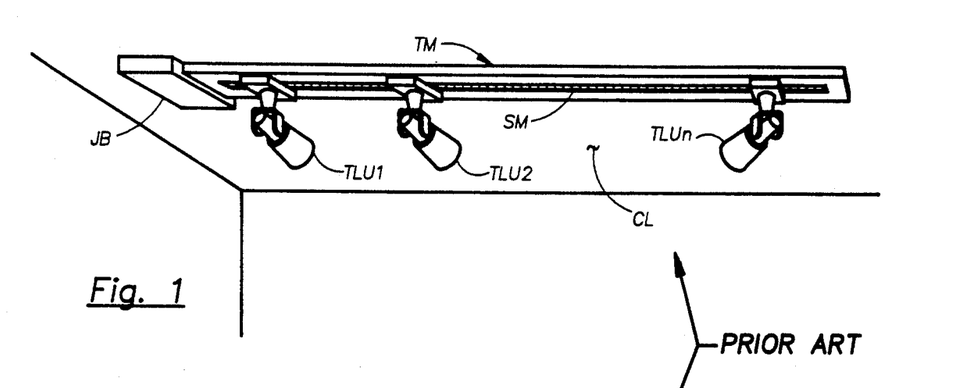
FIG. 1 diagrammatically illustrates a typical track lighting system.

In FIG. 1, JB represents an electrical junction box in a ceiling CL. Fastened to and extending along the ceiling from this junction box is an electrical track means TM. This track means comprises a slot means SM by way of which a number of track lighting units TLU1, TLU2, - - - TLUn are removably fastened to and connected with the track.

Figure 2:
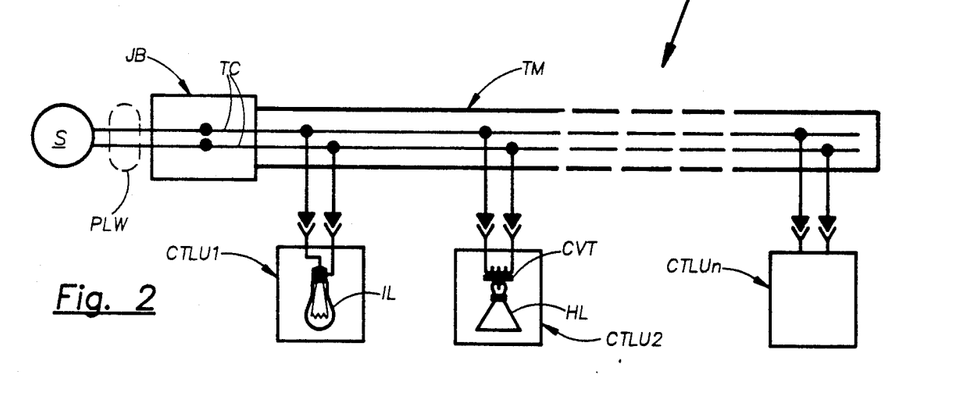
FIG. 2 diagrammatically illustrates the electrical circuit arrangement of a typical present track lighting system.

In FIG. 2, a source S provides a 120 Volt/60 Hz power line voltage across a pair of power line wires PLW, which power line wires enter junction box JB. A pair of track conductors TC connect directly with these power line wires. These track conductors exit from the junction box and extend for the length of track means TM. Disconnectably connected with the track conductors are a number of conventional track lighting units CTLU1, CTLU2 - - - CTLUn.

Track lighting unit CTLU1 comprises an ordinary 120 Volt incandescent lamp IL, the electrical terminals of which are disconnectably connected directly across the track conductors.

Track lighting unit CTLU2 comprises a 12 Volt Halogen lamp HL, the electrical terminals of which are connected with the secondary winding of a conventional 60 Hz step-down voltage transformer CVT. The primary winding of this transformer is disconnectably connected directly across the track conductors.

Figure 3:
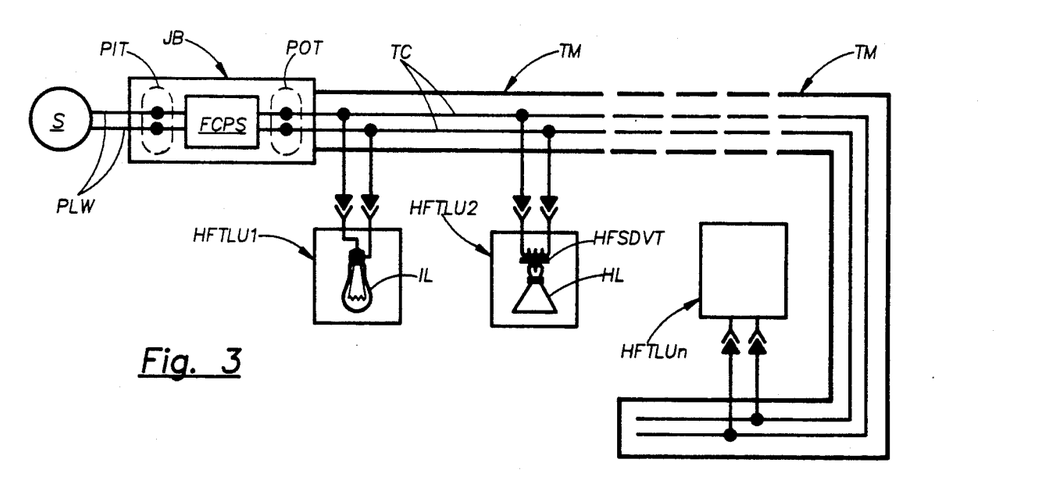
FIG. 3 diagrammatically illustrates the electrical circuit arrangement of the preferred embodiment of subject invention.

In FIG. 3, power line wires PLW from source S enter junction box JB wherein they connect with power input terminals PIT of frequency-converting power supply FCPS. The output from frequency-converting power supply FCPS, which is an AC voltage of about 120 Volt RMS magnitude and 30 kHz frequency, is provided at power output terminals POT; which power output terminals are connected with track conductors TC. These track conductors exit from the junction box and extend for the length of track means TM. Disconnectably connected with the track conductors are a number of high-frequency track lighting units HFTLU1, HFTLU2 - - - HFTLUn.

High-frequency track lighting unit HFTLU1 comprises an ordinary 120 Volt incandescent lamp IL, the electrical terminals of which are disconnectably connected directly across the track conductors.

High-frequency track lighting unit HFTLU2 comprises a low voltage (12 Volt) Halogen lamp HL, the electrical terminals of which are connected across the secondary winding of a small high-frequency step-down voltage transformer HFSDVT. The primary winding of this transformer is disconnectably connected directly across the track conductors.

Figure 4:
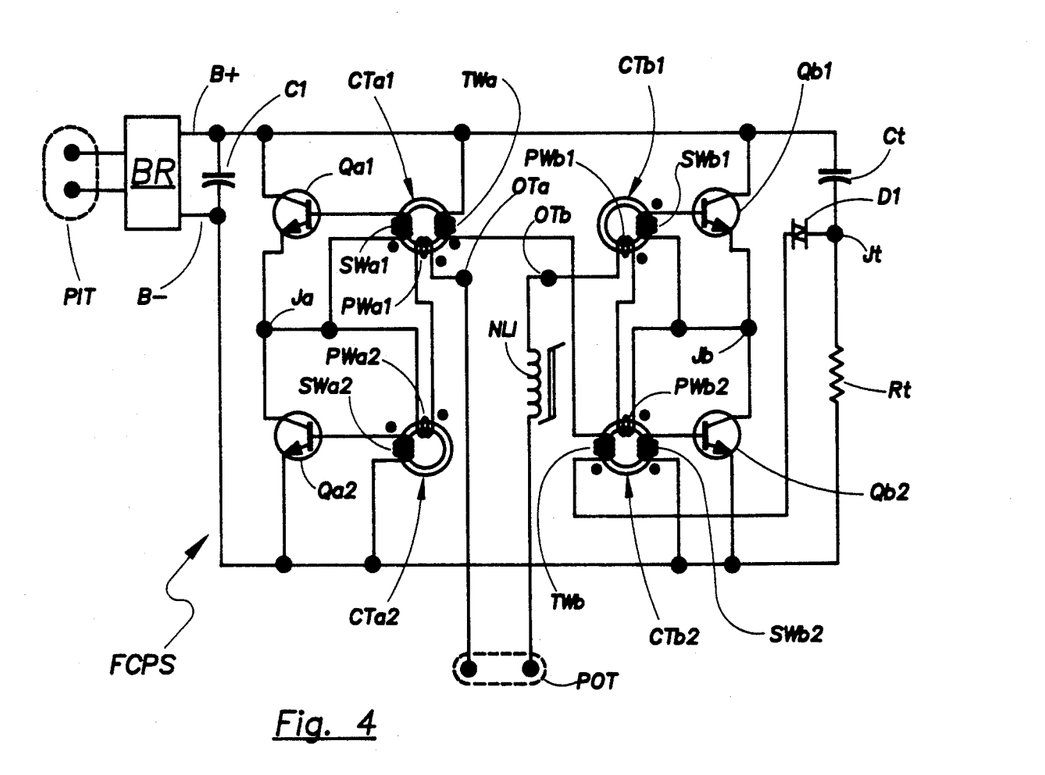
FIG. 4 represents a schematic circuit diagram of the frequency-converting power supply used in the preferred embodiment.

FIG. 4 constitutes an electric circuit diagram of frequency-converting power supply FCPS.

In FIG. 4, a bridge rectifier BR has a pair of power input terminals PIT adapted to connect with ordinary 120 Volt/60 Hz power line voltage.

The positive voltage output from rectifier BR is connected with a B+ bus; and the negative voltage output from rectifier BR is connected with a B− bus. A capacitor C1 is connected betweeen the B+ bus and the B− bus.

A transistor Qa1 is connected with its collector to the B+ bus and with its emitter to a junction Ja. Another transistor Qa2 is connected with its collector to junction Ja and with its emitter to the B− bus.

Similarly, a transistor Qb1 is connected with its collector to the B+ bus and with its emitter to a junction Jb; while yet another transistor Qb2 is connected with its collector to junction Jb and with its emitter to the B− bus.

The base of transistor Qa1 is connected with junction Ja by way of secondary winding SWa1 on current transformer CTa1; and the base of transistor Qa2 is connected with the B− bus by way of secondary winding SWa2 of current transformer CTa2.

Similarly, the base of transistor Qb1 is connected with junction Jb by way of secondary winding SWb1 on current transformer CTb1; and the base of transistor Qb2 is connected with the B− bus by way of secondary winding SWb2 of current transformer CTb2.

An output terminal OTa is connected with junction Ja by way of series-connected primary windings PWa1 and PWa2 of current transformers CTa1 and CTa2, respectively.

Another output terminal OTb is connected with junction Jb by way of series-connected primary windings PWb1 and PWb2 of current transformers CTb1 and CTb2, respectively.

Output terminals OTa and OTb are connected with power output terminals POT by way of a non-linear inductor NLI.

A capacitor Ct is connected between the B+ bus and a junction Jt; and a resistor Rt is connected between junction Jt and the B− bus. A Diac D1 is connected between junction Jt and the B+ bus by way of series-connected tertiary windings TWa and TWb of current transformers CTa1 and CTb2, respectively.

Details of Operation

The operation of an ordinary track lighting system, such as the one illustrated in FIG. 1, is well understood. In particular, it involves the mounting of a track onto and along a surface, such as a ceiling; which track comprises a slot that is capable of receiving, holding and powering a number of various types of track lighting units. Any one or all of these track lighting units can readily be removed from and/or moved along the track.

When a track lighting unit is inserted into the slot, it makes electrical contact with a pair of conductors therein; from which pair of conductors it gets its operating power.

For further information with respect to ordinary track lighting systems, as well as with respect to a track lighting system designed for powering the track conductors with a voltage of 12 Volt RMS magnitude, reference is made to Galindo. U.S. Pat. No. 4,414,617.

As illustrated by FIG. 2, in a conventional track lighting system, the track operating power is provided in the form of an ordinary 120 Volt/60 Hz voltage; which voltage is provided to the conductors in the track directly from a conventional electric utility power line.

As illustrated by FIG. 3, in a track lighting system according to the present invention, the track operating power is provided in the form of 120 Volt/30 kHz voltage; which voltage is provided to the track from the output of frequency-converting power supply FCPS.

Frequency-converting power supply, which operates in the manner described hereinbelow, is powered from the ordinary 120 Volt/60 Hz power line voltage provided by an ordinary electric utility power line.

With a 120 Volt/30 kHz voltage on the track, it becomes particularly simple and cost-effective to provide for various voltage transformations and/or current limitations, etc.—as required by the various lighting means useful in track lighting.

For instance, in respect to lighting unit HFTLU1, no transformation means at all is required for an ordinary 120 Volt incandescent lamp; which, of course, is not any different from the case with 120 Volt/60 Hz on the track.

On the other hand, in respect to lighting unit HFTLU2, a transformer means must be used to provide the requisite voltage step-down transformation required by the 12 Volt Halogen lamp used therein. However, with the frequency of the track voltage being so high, the size, weight and cost of this transformer are substantially smaller than those of the transformer required in lighting unit CTLU2 of the conventional track lighting system.

Frequency-converting power supply FCPS of FIG. 4 comprises a bridge rectifier (BR) operative to provide unfiltered full-wave-rectified 120 Volt/60 Hz power line voltage between the B+ bus and the B− bus. The purpose of capacitor C1 is that of providing a low-impedance path for 30 kHz inverter currents. However, it provides substantially no filtering for the full-wave-rectified power line voltage present between the B+ bus and the B− bus.

Thus, the voltage applied to the full-bridge inverter, which consists principally of transistors Qa1, Qa2, Qb1 and Qb2, is a series of sinusoidally-shaped unidirectional voltage pulses provided at the rate of 120 pulses per second. The RMS magnitude of this pulsed DC voltage is 120 Volt—just as is the RMS magnitude of the AC voltage applied to the full-bridge rectifier means BR.

In other words, the RMS magnitude of the DC voltage applied to the full-bridge inverter is 120 Volt; which—as long as the inverter oscillates—makes the RMS magnitude of the inverter output voltage also 120 Volt.

Otherwise, except for the function of non-linear inductor NLI, the operation of the full-bridge inverter of FIG. 4 is entirely analogous to that of the half-bridge inverter described Nilssen in U.S. Pat. No. 4,506,318.

The inverter self-oscillates by way of current feedback provided by the four positive feedback current transformers CTa1, CTa2, CTb1 and CTb2; which means that the inverter will not oscillate without having a load connected between its power output terminals POT. Thus, the inverter used in the frequency converter of FIG. 1 stops oscillating whenever special light bulb SLB is switched OFF or removed.

The function of non-linear inductor NLI relates to the fact that the load presented to power output terminals POT is substantially resistive and may vary from as little as a single 20 Watt lamp to as much as, say, ten 50 Watt lamps. The function of non-linear inductor NLI is that of providing an inductance in series with the resistive load; which inductance is of such nature as to represent: (i) a relatively high inductance value as long as the load current is relatively small (i.e., for relatively light loads); but (ii) due to saturation, a relatively low inductance value for relatively high loads. That way, regardless of the magnitude of the output current, the inductor provides for a brief delay in the reduction (or reversal) of load current in response to a reduction (or reversal) of the magnitude of the inverter's output voltage; which brief delay will be present at all different levels of load and will help prevent destructive and/or highly dissipative common-mode conduction of the switching transistors; which common-mode conduction results from transistor storage time effects. The net effect of the non-linear inductor on the effective or RMS magnitude of the output voltage will be negligible; which is to say: as long as the inverter indeed oscillates, the absolute instantaneous magnitude of the inverter's output voltage will at all times be substantially equal to the absolute instantaneous magnitude of the DC supply voltage existing between the B− bus and the B+ bus. And, of course, as an inherent result of full-wave rectification, the absolute instantaneous magnitude of this DC supply voltage is substantially equal to that of the power line voltage provided at power input terminals PIT.

Thus, as long as the inverter of frequency-converting power supply PCPS indeed oscillates, the voltage present across power output terminals POT is a 30 kHz squarewave voltage with an absolute instantaneous magnitude about equal to that of the power line voltage provided at power input terminals PIT.

In fact, as long as the inverter indeed oscillates, since the forward voltage drops of the rectifiers and transistors are each of negligible magnitude, and since the voltage drops across the primary windings of the four current transformers are each of negligible magnitude, and since the net effective voltage drop across non-linear inductor NLI is of negligible magnitude, then the absolute instantaneous magnitude of the output voltage present across power output terminals POT must inherently be substantially equal to that of the input voltage present across power input terminals PIT—as long as the magnitude of this input voltage is substantially larger than the sum of the various voltage drops.

As seen from another perspective, the function of the inverter is simply that of rapidly switching each one of the output terminals (f.ex. OTa) back and forth between the B− bus and the B+ bus. As a result, during any given half-cycle of the power line voltage, the inverter simply operates to rapidly (at a 30 kHz rate) switch each one of its output terminals (f.ex. OTa) between the two power line conductors (as connected with terminals PIT). Thus, with reference to FIG. 3, frequency-converting power supply FCPS simply acts to connect power line wires PLW with track conductors TC in a rapidly reversing manner—as if the two pairs of wires were connected by way of a rapidly reversing (or oscillating) four-pole reversing switch. This inherently means that one of the track conductors is always electrically connected with one of the power line wires; which, in turn, means that the electrical potential of one of the track conductors is always equal to the electrical potential of one or the other of the conductors of the power line wires.

ADDITIONAL COMMENTS (a) Without having to resort to the use of a power transformer, subject invention provides for the flexibility of furnishing voltages to the track that are of significantly different magnitudes than 120 Volt RMS. For instance, by using a half-bridge inverter, it is readily possible—without the use of a voltage transformer—to furnish the track with a voltage of 60 Volt RMS magnitude even if the power line voltage is 120 Volt.

(b) Transformer HFSDVT of the track lighting arrangement of FIG. 3 is designed to be powered at its primary winding with a voltage of about 30 kHz frequency. The transformer would not function at all if it were to be powered at its primary winding with a voltage of ordinary power line frequency (i.e., 60 Hz).

(c) In the frequency-conversion circuit of FIG. 4, an important characteristic is that there always exists an electrically conductive path between either one of power output terminals POT and either one of power input terminals POT.

(d) As long as the frequency-converting power supply (FCPS) is in actual operation, the output voltage provided at power output terminals POT is a square-wave voltage of frequency equal to about 30 kHz and with absolute instantaneous magnitude about equal to that of the power line voltage provided at power input terminals POT; which is to say that, at any moment in time, the absolute magnitude of the voltage existing between track conductors TC is substantially equal to that of the power line voltage existing between power input terminals PIT.

(e) It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. An arrangement comprising:
a source providing a power line voltage between a first and a second power line terminal;
a power track having a first and a second track conductor; the power track being operative to receive and hold a number of track lighting units; each one track lighting unit having a pair of load terminals; which load terminals, when the one track lighting unit has been received and is indeed being held by the power track, make electrical connection with the track conductors; and
voltage conditioner means connected in circuit between the power line terminals and the track conductors; the voltage conditioner means being operative to convert the power line voltage provided between the power line terminals to a track voltage provided betweeen the track conductors; there being, through the voltage conditioner means, an electrical conduction path between the first track conductor and one of the power line terminals; the fundamental frequency of the track voltage being substantially higher than that of the power line voltage.

2. The arrangement of claim 1 wherein the absolute instantaneous magnitude of the track voltage is substantially equal to that of the power line voltage during a significant part of each half-cycle of the power line voltage.

3. The arrangement of claim 1 wherein the first track conductor is, via action occurring within the voltage conditioner means, alternatively and periodically switched between the first and the second power line terminal at the frequency of the track voltage.

4. The arrangement of claim 1 wherein the first track conductor is, via action taking place within the voltage conditioner means, periodically connected with the first power line voltage; such that, while such connection is taking place, the electrical potential of the first track terminal is substantially the same as that of the first power line terminal.

5. An arrangement comprising:
a source providing a power line voltage between a first and a second power line terminal;
a power track having a first and a second track conductor; the power track being operative to receive and releaseably hold a number of track lighting units; each one track lighting unit having a pair of load terminals; which load terminals, when said one track lighting unit has been received and is indeed being held by the power track, make electrical connection with the track conductors; and
voltage conditioner means connected in circuit between the power line terminals and the track conductors; the voltage conditioner means being characterized by functioning: (i) repeatedly and periodically to connect for a brief period of time the first track conductor with the first power line terminal, and (ii) in such manner as to provide between the track conductors a track voltage having a fundamental frequency substantially higher than that of the power line voltage.

6. The arrangement of claim 5 wherein the brief period of time has a duration that is approximately equal to half that of the fundamental period of the track voltage.

7. An arrangement comprising:
a source providing a power line voltage between a first and a second power line terminal;
a power track having a first and a second track conductor; the power track being operative to receive and releaseably hold a number of track lighting units; each one track lighting unit having a pair of load terminals; which load terminals, when said one track lighting unit has been received and is indeed being held by the power track, make electrical connection with the track conductors; and
voltage conditioner means connected in circuit between the power line terminals and the track conductors; the voltage conditioner means being characterized by functioning: (i) periodically and alternatively to cause electrical connection between the first track conductor and the first and second power line terminals, and (ii) to provide between the track conductors a track voltage having a fundamental frequency substantially higher than that of the power line voltage.

8. An arrangement comprising:
source means providing a power line voltage between a pair of power line terminals; and
power track and lighting means characterized by including:
(a) a pair of main input terminals connected with the power line terminals;
(b) a pair of track conductors;
(c) a slot means;
(d) a track lighting unit having an incandescent lamp with a pair of lamp terminals, the track lighting unit also having a pair of power input terminals and a pair of power output terminals; the power output terminals being connected with the lamp terminals; the track lighting unit being inserted into the slot means, thereby to cause the power input terminals to connect with the track conductors; and
(e) voltage conditioner means connected in circuit between the main input terminals and the power output terminals;
the power track and lighting means being further characterized by functioning such that:
(f) there exists an electrical conduction path between the track conductors and the power line terminals; and
(g) an output voltage exists across the lamp terminals; the output voltage being of frequency substantially higher than that of the power line voltage and having an RMS magnitude that varies periodically in synchronism with, as well as in proportion with, the instantaneous absolute magnitude of the power line voltage.

9. An arrangement comprising:
source means operative to provide a power line voltage at a pair of power line terminals;
voltage conditioner means; and
power track means having track conductors and track receptacle means; the track conductors being: (i) connected with the power line terminals by way of the voltage conditioner means, and (ii) having a track voltage of frequency substantially higher than that of the power line voltage; there being, by way of the voltage conditioner means, an electrical conduction path between the track conductors and the power line conductors.

10. The arrangement of claim 9 wherein the track voltage has an RMS magnitude that is proportional to the instantaneous absolute magnitude of the power line voltage.

11. An arrangement comprising:

source means operative to provide a power line voltage at a pair of power line terminals;

power track means having track conductors and track receptacle means operable to receive and hold plural track lighting units; and voltage conditioner means connected between the power line terminals and the track conductors; the voltage conditioner means being operative: (i) to provide to the track conductors a track voltage of frequency substantially higher than that of the power line voltage; and (ii) to cause an electrical conduction path to exist between the track conductors and the power line conductors.

12. An arrangement characterized by comprising:

a power track means having track conductors and a receptacle slot; the track conductors being connected in circuit with a pair of power line conductors of an ordinary electric utility power line; an AC power line voltage being present at the power line conductors; and plural lighting units; each lighting unit: (i) having a pair of input terminals, (ii) being operable to be inserted into the receptacle slot and to connect with the track conductors, (iii) having an incandescent lamp with a pair of lamp terminals, and (iv) when indeed being inserted into the receptacle slot, causing a high-frequency voltage to be applied to the lamp terminals; the frequency of the high-frequency voltage being substantially higher than that of the AC power line voltage; the RMS magnitude of the high-frequency voltage being modulated in direct proportion with the instantaneous absolute magnitude of the AC power line voltage.

13. An arrangement comprising:

a power line providing an AC power line voltage at a pair of power line terminals; and power track means having a pair of track conductors connected in circuit with the power line terminals; the power track means having a receptacle slot operative to receive and disconnectably hold a number of track lighting units; a track voltage existing between the track conductors; the voltage being of frequency substantially higher than that of the power line voltage; the instantaneous absolute magnitude of the track voltage being substantially equal to that of the power line voltage.

* * * * *

US005180952C1

(12) EX PARTE REEXAMINATION CERTIFICATE (6135th)
United States Patent
Nilssen (10) Number: US 5,180,952 C1
(45) Certificate Issued: Mar. 4, 2008

(54) ELECTRONIC TRACK LIGHTING SYSTEM

(76) Inventor: Ole K. Nilssen, Caesar Dr., Barrington, IL (US) 60010

Reexamination Request:
No. 90/007,701, Aug. 31, 2005

Reexamination Certificate for:
| | |
|---|---|
| Patent No.: | 5,180,952 |
| Issued: | Jan. 19, 1993 |
| Appl. No.: | 07/831,086 |
| Filed: | Feb. 7, 1992 |

Related U.S. Application Data (63) Continuation of application No. 07/611,334, filed on Nov. 13, 1990, now abandoned, which is a continuation of application No. 07/484,278, filed on Feb. 26, 1990, now abandoned, which is a continuation-in-part of application No. 07/387,370, filed on Jul. 31, 1989, now abandoned, which is a continuation of application No. 07/108,963, filed on Oct. 16, 1987, now abandoned, which is a continuation of application No. 06/471,132, filed on Mar. 1, 1983, now abandoned.

(51) Int. Cl.
| | |
|---|---|
| *H05B 37/00* | (2006.01) |
| *H05B 39/00* | (2006.01) |
| *H05B 41/28* | (2006.01) |
| *H05B 39/04* | (2006.01) |
| *H05B 41/285* | (2006.01) |
| *H02M 7/5383* | (2006.01) |

(52) U.S. Cl. ............... 315/210; 315/209 R; 315/226; 315/DIG. 5

(58) Field of Classification Search ............ None
See application file for complete search history.

(56) References Cited

U.S. PATENT DOCUMENTS

| | | | | |
|---|---|---|---|---|
| 3,733,541 | A | * | 5/1973 | Elms ............... 315/205 X |
| 4,104,715 | A | | 8/1978 | Lawson |
| 4,164,014 | A | | 8/1979 | Crowe |
| 4,233,545 | A | | 11/1980 | Webster |
| 4,414,617 | A | | 11/1983 | Galindo |
| 4,502,107 | A | | 2/1985 | Nilssen |
| 4,506,318 | A | | 3/1985 | Nilssen |
| 4,591,764 | A | | 5/1986 | Nilssen |
| 5,083,255 | A | | 1/1992 | Nilssen |

OTHER PUBLICATIONS

Motorola Semiconductor Power Circuits Handbook, First Ed. (1968), Chap. 1 pp. 1–18—1–23; Chap. 2, pp. 2–1—2–65.

General Electric Controlled Rectifier Manual, First Ed. (1960), Chap. 7, pp. 82–105; Chap. 8, pp. 106–143.

Motorola Application Note AN–199, "A Solid–State 15KHz Power Inverter," Jack Takesuye (1967).

Motorola Application Note AN–222, "The ABC's of DC to AC Inverters," rev. by Robert Haver (1972).

Declaration of Paul Gran re U.S. Patent No. 5,036,253 (Jul. 20, 2005) (signed).

(Continued)

*Primary Examiner*—James Menefee (57) ABSTRACT

To permit the more cost-effective use of low voltage lamps (especially 12 Volt Halogen lamps) in track lighting systems, the power track is supplied from the power line by way of a frequency-converting power supply providing onto the track conductors a voltage of normal power line voltage magnitude (120 Volt RMS) but of an exceptionally high frequency (30 kHz). As a result, the individual step-down voltage transformer required to provide the proper low voltage for operating each of the low voltage lamps becomes very light, small and inexpensive. Yet, in contrast with situations where the whole track may be provided with low voltage from a single step-down voltage transformer, there will be no unusual limitations in respect to track length and/or the number of low voltage lamps that can be used with a given track. Moreover, there will be no problem with using regular high voltage incandescent lamps intermixed with low voltage lamps. For improved efficiency and reduced bulk, the frequency-conversion means placed at the head of the track is a direct-coupled rectifier-inverter combination.

OTHER PUBLICATIONS

Declaration of Paul Gran re U.S. Patent No. 5,144,202 (Jul. 20, 2005) (signed).

Supplemental Declaration of Paul Gran re U.S. Patent No. 5,144,202 (Oct. 20, 2005) (signed).

Supplemental Declaration of Paul Gran re U.S. Patent No. 5,036,253 (Oct. 20, 2005) (signed).

Memorandum Opinion and Order—Judge John W. Darrah (Jun. 28, 2006); *Nilssen* v. *Osram* (01 C 3585).

* cited by examiner

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appaered in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 5–17:

This application is a continuation of Ser. No. 07/611,334 filed Nov. 13, 1990, now abandoned; which is a continuation of Ser. No. 07/484,278 filed Feb. 26, 1990, now abandoned; which is a continuation-in-part of Ser. No. 07/387,370 filed Jul. 31, 1989, now abandoned; which is a continuation of Ser. No. 07/108,963 filed Oct. 16, 1987, now abandoned; which is a continuation of Ser. No. [06/741,132, filed Jun. 4, 1985, now abandoned; which is a continuation-in-part of Ser. No. 06/667,691 filed Nov. 2, 1984, now abandoned; which is a continuation-in-part of Ser. No. 06/487,817 filed Apr. 22, 1983 now U.S. Pat. No. 4,506,318] *06/471,132, Mar. 1, 1983, abandoned*.

AS A RESULT OF REEXAMINATION, IT HAS BEEN DETERMINED THAT:

The patentability of claim 12 is confirmed.

Claim 13 is cancelled.

Claims 1, 5, 7–9 and 11 are determined to be patentable as amended.

Claims 2–4, 6 and 10, dependent on an amended claim, are determined to be patentable.

New claims 14 and 15 are added and determined to be patentable.

1. An arrangement comprising:
   a source providing a power line voltage between a first and a second power line terminal;
   a power track having a first and a second track conductor; the power track being operative to receive and hold a number of track lighting units; each one track lighting unit having a pair of load terminals; which load terminals, when the one track lighting unit has been received and is indeed being held by the power track, make electrical connection with the track conductors; and
   voltage conditioner means connected in circuit between the power line terminals and the track conductors; the voltage conditioner means being operative to convert the power line voltage provided between the power line terminals to a track voltage provided between the track conductors; there being, through the voltage conditioner means, an electrical conduction path between the first track conductor, *a non-linear inductance,* and one of the power line terminals; the fundamental frequency of the track voltage being substantially higher than that of the power line voltage.

5. An arrangement comprising:
   a source providing a power line voltage between a first and a second power line terminal;
   a power track having a first and a second track conductor; the power track being operative to receive and releaseably hold a number of track lighting units; each one track lighting unit having a pair of load terminals; which load terminals, when said one track lighting unit has been received and is indeed being held by the power track, make electrical connection with the track conductors; and
   voltage conditioner means connected in circuit between the power line terminals and the track conductors; the voltage conditioner means being characterized by functioning: (i) repeatedly and periodically to connect for a brief period of time the first track conductor with the first power line terminal *through a non-linear inductance,* and (ii) in such manner as to provide between the track conductors a track voltage having a fundamental frequency substantially higher than that of the power line voltage.

7. An arrangement comprising:
   a source providing a power line voltage between a first and a second power line terminal;
   a power track having a first and a second track conductor; the power track being operative to receive and releaseably hold a number of track lighting units; each one track lighting unit having a pair of load terminals; which load terminals, when said one track lighting unit has been received and is indeed being held by the power track, make electrical connection with the track conductors; and
   voltage conditioner means connected in circuit between the power line terminals and the track conductors; the voltage conditioner means being characterized by functioning: (i) periodically and alternatively to cause electrical connection between the first track conductor and the first [and] *or* second power line [terminals] *terminal through a non-linear inductance*, and (ii) to provide between the track conductors a track voltage having a fundamental frequency substantially higher than that of the power line voltage.

8. An arrangement comprising:
   source means providing a power line voltage between a pair of power line terminals; and
   power track and lighting means characterized by including:
   (a) a pair of main input terminals connected with the power line terminals;
   (b) a pair of track conductors;
   (c) a slot means;
   (d) a track lighting unit having an incandescent lamp with a pair of lamp terminals, the track lighting unit also having a pair of power input terminals and a pair of power output terminals; the power output terminals being connected with the lamp terminals; the track lighting unit being inserted into the slot means, thereby to cause the power input terminals to connect with the track conductors; and
   (e) voltage conditioner means connected in circuit between the main input terminals and the power output terminals;
   the power track and lighting means being further characterized by functioning such that:

(f) there exists an electrical conduction path between *one of* the track conductors and *one of* the power line terminals through *a non-linear inductance*; and (g) an output voltage exists across the lamp terminals; the output voltage being of frequency substantially higher than that of the power line voltage and having an RMS magnitude that varies periodically in synchronism with, as well as in proportion with, the instantaneous absolute magnitude of the power line voltage.

9. An arrangement comprising:

source means operative to provide a power line voltage at a pair of power line terminals;

voltage conditioner means; and power track means having track conductors and track receptacle means; the track conductors being: (i) connected with the power line terminals by way of the voltage conditioner means, and (ii) having a track voltage of frequency substantially higher than that of the power line voltage; there being, by way of the voltage conditioner means, an electrical conduction path between *one of* the track conductors and *one of* the power line conductors *through a non-linear inductance*.

11. An arrangement comprising:

source means operative to provide a power line voltage at a pair of power line terminals;

power track means having track conductors and track receptacle means operable to receive and hold plural track lighting units; and voltage conditioner means connected between the power line terminals and the track conductors; the voltage conditioner means being operative: (i) to provide to the track conductors a track voltage of frequency substantially higher than that of the power line voltage; and (ii) to cause an electrical conduction path to exist between *one of* the track conductors and *one of* the power line conductors *through a non-linear inductance*.

14. An arrangement characterized by comprising:

*a power track means having two and only two track conductors and a receptacle slot; the track conductors being connected in circuit with a pair of power line conductors of an ordinary electric utility power line; an AC power line voltage being present at the power line conductors; and*

*plural lighting units; each lighting unit: (i) having a pair of input terminals; (ii) being operable to be inserted into the receptacle slot and to connect with the track conductors; (iii) having an incandescent lamp with a pair of lamp terminals; and (iv) when indeed being inserted into the receptacle slot, causing a high-frequency voltage to be applied to the lamp terminals; the frequency of the high-frequency voltage being substantially higher than that of the AC power line voltage; the RMS magnitude of the high-frequency voltage being modulated in direct proportion with the instantaneous absolute magnitude of the AC power line voltage.*

15. An arrangement comprising:

*a power line providing an AC power line voltage at a pair of power line terminals; and*

*power track means having one and only one pair of track conductors connected in circuit with the power line terminals; the power track means having a receptacle slot operative to receive and disconnectably hold a number of track lighting units; a track voltage existing between the track conductors; the voltage being of frequency substantially higher than that of the power line voltage; the instantaneous absolute magnitude of the track voltage being substantially equal to that of the power line voltage.*

\* \* \* \* \*